Feb. 5, 1929.

W. R. FISHER 1,700,837

LATHE CENTER HOLDER

Filed May 7, 1925

INVENTOR.
W. REUEN FISHER
BY
ATTORNEY.

Patented Feb. 5, 1929.

1,700,837

UNITED STATES PATENT OFFICE.

W REUEN FISHER, OF DETROIT, MICHIGAN.

LATHE-CENTER HOLDER.

Application filed May 7, 1925. Serial No. 28,543.

My invention relates to a new and useful improvement in a lathe center holder and has for its object, the provision of a lathe center holder which will permit the free movement of a lathe center.

Another object of the invention is the provision in a lathe center holder of floating means for retaining the center point of a lathe in operative position, free for longitudinal movement.

Another object of the invention is the provision in a lathe center holder of thrust delivery means which are adapted for transmitting the thrust indirectly to a pair of freely supported bearings.

Another object of the invention is the provision in a lathe center holder of means for retaining the center point of a lathe in outwardly projected position relatively to the holder, while at the same time permitting the backward longitudinal movement of the holder.

Other objects will appear hereinafter.

The invention consists in the combinations and arrangements of parts hereinafter described and claimed.

Figure 1:
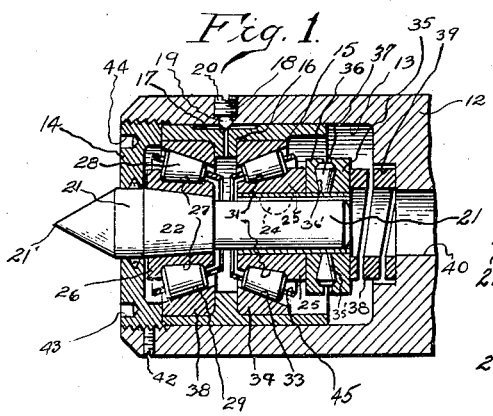
Figure 2:
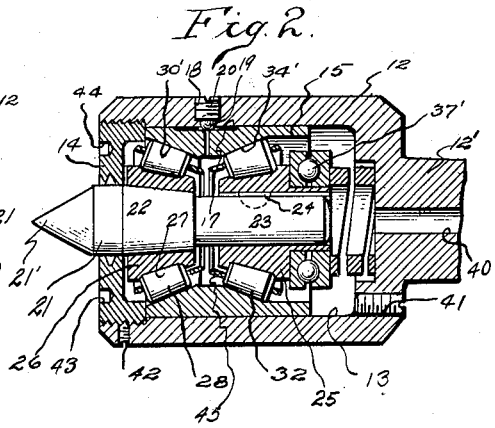
Figure 3:
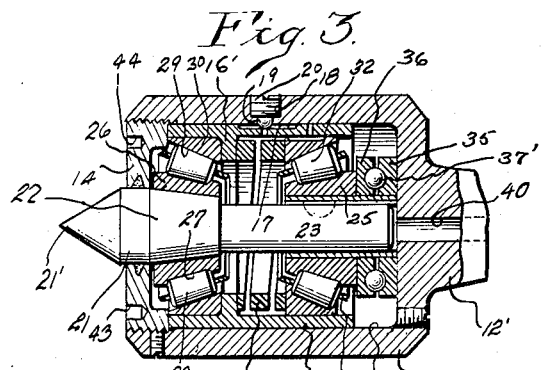
Figure 4:
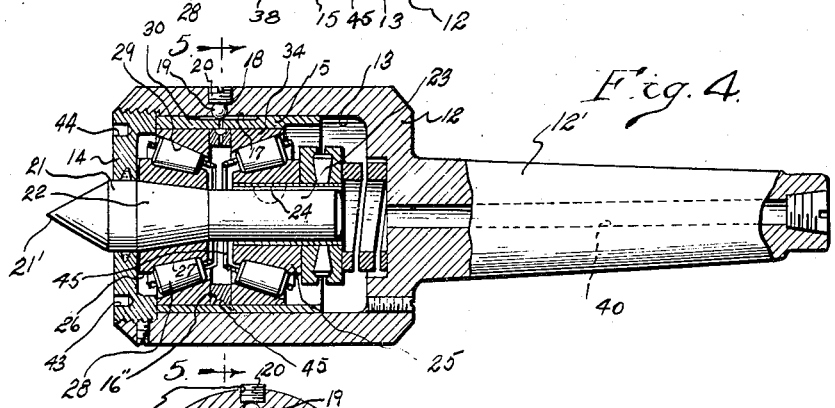
Figure 5:
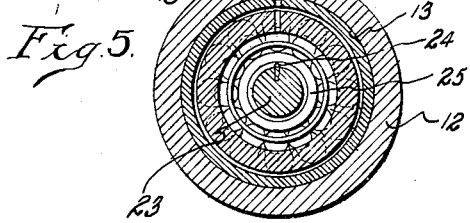

The invention will be best understood from a reference to the accompanying drawings which form a part of this specification and in which, Fig. 1 is a longitudinal vertical sectional view of the invention, Fig. 2 is a longitudinal vertical sectional view of a modified form of the invention, Fig. 3 is a longitudinal vertical sectional view of a further modified form of the invention, Fig. 4 is a longitudinal vertical sectional view of the invention showing the shank in elevation, Fig. 5 is a sectional view taken on substantially line 5—5 of Fig. 4.

As shown in Fig. 2, a head 12 is mounted upon a shank 12'. If desired, the head may be continued of the same diameter throughout its length, so that the tapered shank 12' may be dispensed with, as shown in Fig. 1. The head is provided with a recess 13, which is adapted for being closed at its open end with a suitable cap 14, interiorly threaded into the outer edges of the recess 13. Mounted in the recess 13 is a sleeve 15 having a centrally formed circumferentially extending inwardly projected ring 16. Formed in the periphery of the sleeve 15, is an axially extending slot 17, in which is adapted to engage a locking ball 19, positioned in a recess 18 formed in the head 12, the ball 19 being retained in position by a suitable plug 20, which may be threaded into the opening 18. The center point comprises a head 21, tapered to a point as at 21', the head 21 being provided with a tapered neck 22 terminating with a reduced shank 23, so as to provide a shoulder at the base of the tapered neck 22. The shank 23 is provided with a longitudinally extending key 24, adapted to project slightly from the periphery thereof, and to engage in an axially extending slot formed in the inner surface of a bushing 23' in the bore of the bearing 25. A similar bearing 26 is mounted upon the tapered neck 22 of the center piece, said bearing 26 being provided around its periphery with a recess or raceway 27 which inclines to the axis of the bearing 26 and affords a pocket or raceway for engagement with the roller bearings 28, which are adapted also to engage upon the inclined face 29 of the bearing ring 30, the inner face of which is adapted to engage the inwardly projecting rib 16 formed on the ring 15. The bearing 25 is also provided, on its periphery, with a recess 31 to provide a raceway for the reception of the roller bearings 32, the raceway being inclined to the axis of the bearing 25 and the rollers 32 being adapted to engage the inclined faces 33 of the bearing ring 34 which is mounted in the sleeve 15 and engaging at one side against one of the faces of the inwardly projecting rib 16. Mounted loosely upon the bushing 23' is a thrust bearing comprising the ring 36 and the ring 35. The ring 36 being provided with a recess 36', co-operating with the recess 35' serves to form a raceway for the conical-shaped roller bearings 37. The head 12 is provided with a recess 39 in which is adapted to engage one end of a spiral spring 38, the opposite end of which is adapted to engage the inner face of the ring 35.

The structure is such that an inwardly directed thrust delivered to the center piece is transmitted through the bearing 26 to the rollers 28. From these rollers, the thrust is delivered to the bearing ring 30 and from the bearing ring 30 through the rib 16, to the bearing ring 34 to the rollers 32 and thence to the bearing 25 and against the face of the ring 36. It is thus seen that the inward thrust delivered to the center piece is spread over a maximum area, so that a formation of the various parts of lighter material is possible without in any way lessening the efficiency of the device or reducing its life on account of wear. It will be noted that the bearing blocks 25 and 26 and the bearing rings 30 and 34 are loosely positioned in the cylinder or sleeve 15, so that they are free for longitudinal movement in the sleeve. The bearing 25 is, however, as shown in Fig. 1 normally retained in engagement with the rib 16 through the action of the spiral spring 38. However, when an inward thrust is delivered to the center piece, the center piece is permitted to move longitudinally in the head in which supported. This feature is an important feature of the invention inasmuch as it allows the center piece to compensate automatically for any expansion or contraction which may take place in the workpiece, when being operated upon.

Those skilled in the art will readily understand that the workpiece, when being worked upon, is subjected to expansion and contraction, because of the heat developed when the work is being done. This automatic adjustment eliminates the necessity of loosening the center point carrying means by hand, when the workpiece is being operated upon, and tightening the center point to a degree which, as the work proceeds, must, from time to time, be altered.

In Fig. 2, I have shown the head 12 provided with a taper shank 12'. The sleeve 15 is provided with a boss projecting inwardly and having the oppositely inclined faces 30' and 34' for engagement with the roller bearings 28 and 32, the separate bearing rings 30 and 34 and the inwardly projecting rib 16 being eliminated. The roller bearings 37 are replaced with ball bearings 37'', the remaining structure being the same as the structure shown in Fig. 1. The head 12 in the form shown in Fig. 2 is provided with an opening 41 in which may be threaded a suitable plug, this opening being provided for the insertion of a suitable tool for forcing the sleeve 15 out of the recess 13.

In the forms shown in Fig. 1 and Fig. 2, a suitable set screw 42 may be threaded into the head to lock the front cover plate 14 in position. As shown in the drawings, this plate 14 is provided with a pair of openings 43 and 44 for the reception of a spanner wrench, so that the cover may be removed from the head.

In the form shown in Fig. 3, the thrust bearing, comprising the plates 35 and 36 and the roller bearings 37' are adapted for engagement with the base of the recess 13. The spring 38 is positioned forwardly of the rear bearing 25 and adapted to engage at one end an inwardly projecting rib 16'. Otherwise, the structure is as already described, and in the form shown in Fig. 3, the expansion of the work piece is compensated for by the compression of the spring 38, the sleeve 15 moving in the recess 13.

In the form shown in Fig. 4, a ring 16'' is provided which has a peripheral groove 45 formed therein for the reception of lubricant. The rib 16 shown in Fig. 1 is replaced by the loose ring 16'', and the form in this view is otherwise the same as shown in Fig. 1, with the exception of the tapered shank 12' which is present. As shown in Figs. 2, 3 and 4, oil grooves 45 may be provided in the interior of the sleeve 15.

In the forms shown in all of the drawings, the head 12 or the shank 12' is provided with a bore 40 through which a suitable tool may be projected for the purpose of forcing the centerpiece out of engagement with the bearings 25 and 26. As shown in Fig. 4, the bore 40 may be closed by a suitable plug, if desired.

From the description of the invention thus given, it is believed apparent that a floating holding device is provided for a centerpiece, which is adapted for automatically adjusting itself to the expansion and contraction of the workpiece and which permits a maximum movement of the centerpiece when in operation, while at the same time, distributing the thrust delivered to the center piece over a maximum area.

While I have illustrated and described the preferred form of structure, I do not wish to limit myself to the precise form of structure shown but desire to avail myself of such variations and modifications as come within the scope of the appended claims.

Having thus described my invention what I claim as new and desire to secure by Letters Patent is:

1. A lathe center holder of the class described, comprising: a shank; a head; on said shank; a sleeve loosely mounted in said head; an inwardly directing, radially extending rib on the inner surface of said sleeve; an annular bearing positioned on opposite sides of said rib, each of said annular bearings having an inner surface inclined to its axis; a cooperating annular bearing for each of said first mentioned annular bearings; roller bearings positioned between said cooperating bearings; a shank projected through said bearings; and means in said head for normally forcing said bearings into engagement with said rib.

2. A lathe center holder of the class described, comprising: a shank; a head on said shank; a sleeve loosely mounted in said head; an inwardly directing, radially extending rib on the inner surface of said sleeve; an annular bearing positioned on opposite sides of said rib, each of said annular bearings having an inner surface inclined to its axis; a cooperating annular bearing for each of said first mentioned annular bearings; roller bearings positioned between said cooperating bearings; a shank projected through said bearings; a thrust bearing embracing said shank and engaging the innermost of said last mentioned bearings; and a spring for engaging said thrust bearing and forcing said first mentioned bearings normally into engagement with the side faces of said rib.

In testimony whereof, I have signed the foregoing specification.

W REUEN FISHER.